United States Patent
Duchateau et al.

(10) Patent No.: US 11,725,672 B2
(45) Date of Patent: Aug. 15, 2023

(54) GAS COMPRESSOR WITH REDUCED ENERGY LOSS

(71) Applicant: Carnot Compression Inc., Reno, NV (US)

(72) Inventors: Christophe Duchateau, Reno, NV (US); Christopher David Finley, Reno, NV (US); Danil Hans Shillinger, Nevada City, CA (US)

(73) Assignee: CARNOT COMPRESSION INC., Reno, NV (US)

( * ) Notice: Subject to any disclaimer, the term of this patent is extended or adjusted under 35 U.S.C. 154(b) by 61 days.

(21) Appl. No.: 17/561,467

(22) Filed: Dec. 23, 2021

(65) Prior Publication Data
US 2022/0120294 A1  Apr. 21, 2022

Related U.S. Application Data

(63) Continuation-in-part of application No. 16/878,512, filed on May 19, 2020, now Pat. No. 11,209,023,
(Continued)

(51) Int. Cl.
*F04F 5/06* (2006.01)
*F04D 31/00* (2006.01)
(Continued)

(52) U.S. Cl.
CPC ............... *F04F 5/06* (2013.01); *F03B 3/08* (2013.01); *F04D 17/10* (2013.01); *F04D 17/18* (2013.01);
(Continued)

(58) Field of Classification Search
CPC ....... F04F 5/06; F04F 5/42; F03B 3/08; F04D 17/10; F04D 17/18; F04D 25/045;
(Continued)

(56) References Cited

U.S. PATENT DOCUMENTS 892,772 A 7/1908 Taylor
1,101,929 A 6/1914 Hayes
(Continued)

FOREIGN PATENT DOCUMENTS

CN 1174594 A 2/1998
CN 102444579 A 5/2012
(Continued)

OTHER PUBLICATIONS

U.S. Appl. No. 14/280,780, filed May 19, 2014, Cherry et al.
(Continued)

*Primary Examiner* — Hoang M Nguyen
(74) *Attorney, Agent, or Firm* — BakerHostetler

(57) ABSTRACT

A gas compressor comprising a rotating drum and a return assembly. The drum includes a compression channel assembly with compression channels between a common zone and a distal area. The compression channels may be formed by a plurality of V-shaped blocks. The return assembly draws liquid from an annular lake formed in the drum to a fluid outlet. A gas inlet in the return assembly mixes incoming gas with the liquid. An optional eductor connected to the gas inlet draws gas into the gas inlet. Fluid entering the common pressure zone is forced into the compression channels that compress the gas. Pressurized gas is separated from liquid in the fluid prior to leaving the compression channel. An inducer may be positioned between the fluid outlet of the return assembly and the opening of the centralized common pressure zone.

20 Claims, 12 Drawing Sheets

Related U.S. Application Data which is a continuation-in-part of application No. 16/418,535, filed on May 21, 2019, now Pat. No. 10,920,793, which is a continuation of application No. 15/429,710, filed on Feb. 10, 2017, now Pat. No. 10,359,055.

(60) Provisional application No. 62/850,484, filed on May 20, 2019.

(51) Int. Cl.
```
F04D 17/18      (2006.01)
F04D 17/10      (2006.01)
F04D 25/04      (2006.01)
H02K 7/18       (2006.01)
F04D 29/22      (2006.01)
F04F 5/42       (2006.01)
F04D 29/28      (2006.01)
F03B 3/08       (2006.01)
F01D 5/04       (2006.01)
```

(52) U.S. Cl.
CPC ....... *F04D 25/045* (2013.01); *F04D 29/2222* (2013.01); *F04D 29/284* (2013.01); *F04D 31/00* (2013.01); *F04F 5/42* (2013.01); *H02K 7/1823* (2013.01); *F01D 5/048* (2013.01); *F05D 2210/132* (2013.01); *F05D 2220/62* (2013.01); *F05D 2260/601* (2013.01)

(58) Field of Classification Search
CPC .... F04D 29/2222; F04D 29/284; F04D 31/00; F04D 29/242; F04D 29/444; H02K 7/1823; F01D 5/048; F01D 1/06; F05D 2210/132; F05D 2220/62; F05D 2260/601
See application file for complete search history.

(56) References Cited

U.S. PATENT DOCUMENTS

| | | |
|---|---|---|
| 1,144,865 A | 6/1915 | Rees |
| 1,457,536 A | 6/1923 | MacLean |
| 1,769,260 A | 7/1930 | Hughes |
| 1,864,640 A | 6/1932 | Dalrymple |
| 1,994,450 A | 3/1935 | Carpenter |
| 2,025,037 A | 12/1935 | Bergamann |
| 2,076,586 A | 4/1937 | Noble |
| 2,118,371 A | 5/1938 | Bergmann |
| 2,230,183 A | 1/1941 | Ford |
| 2,241,460 A | 5/1941 | Huntley |
| 2,260,600 A | 10/1941 | Boeckeler |
| 3,221,659 A | 12/1965 | Adams |
| 3,435,771 A | 4/1969 | Riple |
| 3,517,229 A | 6/1970 | Bidard |
| 3,559,419 A | 2/1971 | Kantor |
| 3,584,878 A | 6/1971 | Seregni |
| 3,584,978 A | 6/1971 | Shimoi |
| 3,650,636 A | 3/1972 | Eskeli |
| 3,761,195 A | 9/1973 | Eskeli |
| 4,027,993 A | 6/1977 | Wolff |
| 4,198,218 A | 4/1980 | Erickson |
| 4,362,473 A | 12/1982 | Zeilon |
| 4,439,200 A | 3/1984 | Meyer et al. |
| 4,626,176 A | 12/1986 | Cole |
| 5,011,371 A | 4/1991 | Goltemoller |
| 5,154,583 A | 10/1992 | Althaus et al. |
| 5,733,253 A | 3/1998 | Headley |
| 6,042,346 A | 3/2000 | Doi |
| 6,276,140 B1 | 8/2001 | Keller et al. |
| 6,402,068 B1 | 6/2002 | Handleman |
| 6,565,315 B1 | 5/2003 | Bertels et al. |
| 6,713,028 B1 | 3/2004 | Oklejas, Jr. |
| 6,723,205 B1 | 4/2004 | Meinander |
| 7,905,360 B2 | 3/2011 | Della Casa |
| 8,966,955 B2 | 3/2015 | Henderson |
| 9,618,013 B2 | 4/2017 | Cherry et al. |
| 9,919,243 B2 | 3/2018 | Cherry et al. |
| 10,507,425 B2* | 12/2019 | Henson ............... B64G 1/48 |
| 10,920,793 B2* | 2/2021 | Cherry ............... F04D 25/045 |
| 11,209,023 B2* | 12/2021 | Duchateau ......... H02K 7/1823 |
| 2003/0106302 A1 | 6/2003 | Ray |
| 2004/0101414 A1 | 5/2004 | Gharib et al. |
| 2004/0197195 A1 | 10/2004 | Ogolla et al. |
| 2005/0047270 A1 | 3/2005 | Wood et al. |
| 2005/0175449 A1 | 8/2005 | Yonehara |
| 2006/0059904 A1 | 3/2006 | Shevket |
| 2007/0144170 A1 | 6/2007 | Griffith |
| 2010/0329891 A1 | 12/2010 | Fong et al. |
| 2011/0030359 A1 | 2/2011 | Fong et al. |
| 2011/0115223 A1 | 5/2011 | Stahlkopf et al. |
| 2015/0023807 A1 | 1/2015 | Cherry et al. |
| 2015/0322763 A1 | 11/2015 | Bjorge et al. |
| 2016/0102673 A1 | 4/2016 | Cherry et al. |
| 2018/0231029 A1 | 8/2018 | Cherry et al. |
| 2020/0277970 A1 | 9/2020 | Duchateau et al. |

FOREIGN PATENT DOCUMENTS

| | | |
|---|---|---|
| CN | 103733003 A | 4/2014 |
| CN | 102655925 B | 1/2015 |
| CN | 105555413 A | 5/2016 |
| DE | 1106028 B | 5/1961 |
| DE | 2356013 A1 | 5/1975 |
| EP | 0096713 A1 | 12/1983 |
| FR | 2248731 A6 | 5/1975 |
| FR | 2589957 A1 | 5/1987 |
| JP | 2016-531734 A | 10/2016 |
| WO | WO 1983/002134 A1 | 6/1983 |
| WO | WO 1987/003051 A1 | 5/1987 |

OTHER PUBLICATIONS

U.S. Appl. No. 62/222,261, filed Sep. 23, 2015, Cherry et al.
Turbines by J.B. Calvert, Feb. 11, 2010 "Turbines" https://mysite.du.edu/jcalvert/tech/fluids/turbine.htm (14 pages).
"Variable Speed Fluid Couplings Driving Centrifugal Compressors and Other Centrifugal Machinery" by Gunther H. Peikert, Houston, Texas (7 pages).
"A Fundamentally New Approach to Air-Cooled Heat Exchangers" by Jeffrey P. Koplow, Jan. 2010, Sandia National Laboratories (48 pages).
Patent Cooperation Treaty International Search Report, PCT/US15/55427, dated Sep. 1, 2016.
European Supplementary Examination Report, PCT/US2014045853, dated Jun. 23, 2016.
Notification of Transmittal of the International Search Report PCT/US/2015/055427, dated Feb. 2, 2016.
PCT Notification of Transmittal of International Preliminary Report on Patentability, PCT/US14/45853, dated Apr. 10, 2015.
Phasor Analysis of Linear Mechanical Systems and Linear Differential Equations ME 104, PRof. B. Paden.
EA3: Systems Dynamics, V1.7 Weakly-Coupled Oscillators, Sridhar Krishnaswamy.
A Guide to Mechanical Impedance and Strutctural Response Techniques, Bruel & Kjaer.
International Patent Application No. PCT/US2018/014399; Int'l Written Opinion and the Search Report; dated Mar. 26, 2018; 14 pages.
International Patent Application No. PCT/US2018/014399; Int'l Preliminary Report on Patentability; dated Apr. 3, 2019; 31 pages.
European Patent Application No. 18751919.4; Extended Search Report; dated Oct. 22, 2020; 5 pages.
International Patent Application No. PCT/US2020/033877; Int'l Search Report and the Written Opinion; dated Aug. 17, 2020; 13 pages.

(56) References Cited

OTHER PUBLICATIONS

International Patent Application No. PCT/US2022/053386; Int'l Search Report and the Written Opinion; dated Mar. 22, 2023; 8 pages.

\* cited by examiner

- Low Pressure Gas
- Liquid
- Gas/Liquid Emulsion
- Make-up Liquid
- Pressured Gas

GAS COMPRESSOR WITH REDUCED ENERGY LOSS

CROSS REFERENCE TO RELATED APPLICATIONS

This application is a continuation-in-part of U.S. patent application Ser. No. 16/878,512, filed May 19, 2020; which claims benefit under 35 U.S.C. § 119(e) of U.S. Provisional Patent Application No. 62/850,484, filed May 20, 2019, the contents of each of which are incorporated herein by reference in their entirety.

U.S. patent application Ser. No. 16/878,512, filed May 19, 2020, also a continuation-in-part of U.S. patent application Ser. No. 16/418,535, filed May 21, 2019, now U.S. Pat. No. 10/920,793, issued Feb. 16, 2021; which is a continuation of U.S. patent application Ser. No. 15/429,710, filed Feb. 10, 2017, now U.S. Pat. No. 10,359,055 issued Jul. 23, 2019, the contents of each of which are incorporated herein by reference in their entirety.

TECHNICAL FIELD

Gas compression systems and, more particularly, internal recirculating centrifugal gas compression systems.

BACKGROUND

In a centrifugal gas compression system, liquid and gas are moved from an inner area to an outer area of a rotating drum. As the liquid and gas move in this manner the gas is compressed and separated from the liquid as it reaches the outer area. Some systems recirculate the liquid from the outer area to the inner area of the system. When the liquid is recirculated externally, meaning outside of the rotating drum of the system there is very little to no energy recovered from the energy input to operate the system. When liquid is recirculated within the drum, such as through a rotating turbine, energy can be recirculated as well, but that energy is recirculated external to the drum. To recover this energy and recirculate it to the drive of the compressor, some type of electrical or mechanical power transmission system is required. It would therefore be desirable to recirculate both liquid and energy without requiring a power transmission system.

The channels through which liquid and gas are moved from the inner area to the outer area are generally tubular. Small capillary tubes may help to force entrained bubbles of gas to be compressed between plugs of liquid. Valves within the tubes or tapered transitions along the tubes may help to prevent gas from leaking back toward the inner area. Capillary tubes, with or without flow restrictions, may be more difficult and costlier to manufacture and present increased energy losses than larger diameter tubes or channels.

SUMMARY

A gas compressor comprising a rotating drum and a return assembly. The drum includes a compression channel assembly with compression channels between a common zone and a distal area. The compression channels may be formed by a plurality of V-shaped blocks. The return assembly draws liquid from an annular lake formed in the drum to a fluid outlet. A gas inlet in the return assembly mixes incoming gas with the incoming liquid, optionally by way of an eductor connected to the gas inlet that draws gas into the gas inlet. The mixed fluid entering the common pressure zone is forced into the compression channels that compress the gas. Pressurized gas is separated from liquid in the fluid after leaving the compression channel. An inducer may be positioned between the outlet of the return assembly and the opening of the centralized common pressure zone.

BRIEF DESCRIPTION OF THE DRAWINGS

The drawings are provided to illustrate example embodiments described herein and are not intended to limit the scope of the disclosure.

DETAILED DESCRIPTION OF ILLUSTRATIVE EMBODIMENTS

Devices, systems and methods are described herein for compressing gas through centrifugal action of a shaft driven compressor drum containing a liquid and a gas. In an energy recovery system for a centrifugal gas compressor that includes a rotating turbine, there may be high liquid pressure at the inlet, but the pressure may drop as the liquid moves toward the outlet, where a velocity of the liquid may match the speed of the compressor drum. As a result, the system may be optimized for power recovery from torque applied to a shaft of a turbine, which may then be transferred to a power transmission system and fed back to the drive for the compressor drum.

Figure 1:
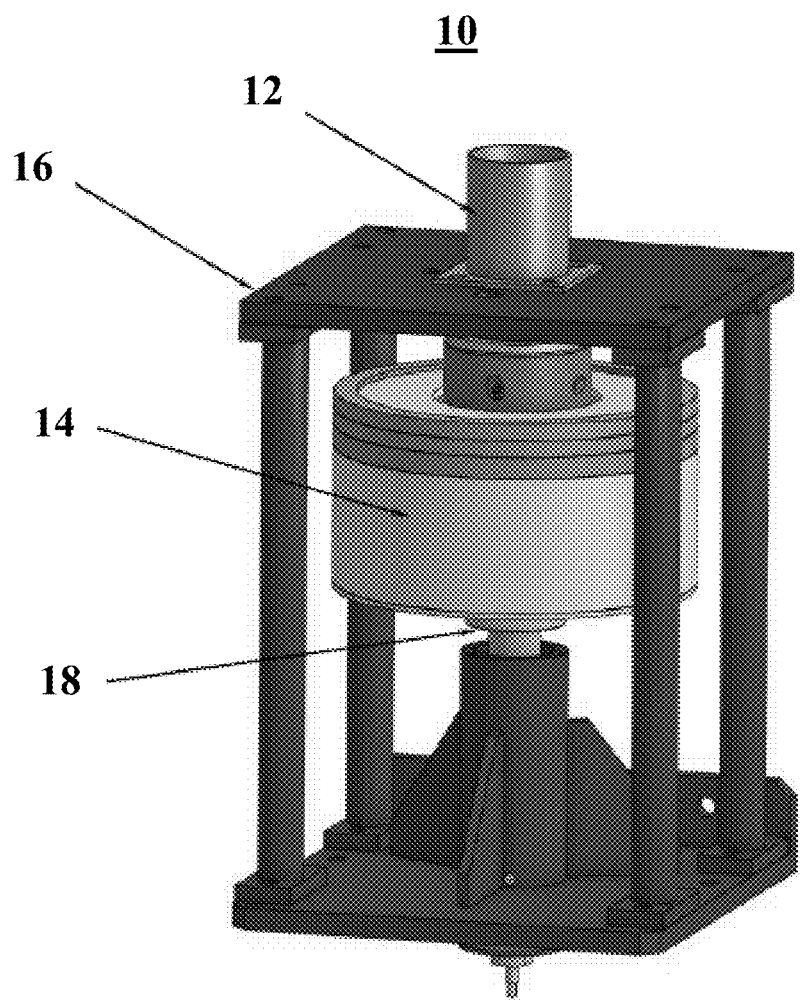
FIG. 1 is a perspective view of a compressor assembly in accordance with an embodiment.

A different type of energy recovery system for a centrifugal compressor 10 is disclosed herein with reference to the Figures. FIG. 1 illustrates an embodiment of the exterior of compressor 10, which includes a return assembly 12 that is static in place of a rotating turbine assembly. In the disclosed system, liquid pressure may be lower at the inlet to the return assembly 12 and remain that way as the fluid moves toward the outlet of the return assembly, and the velocity of the incoming liquid may initially correspond to the rotation speed of the drum of the compressor and a radial position of an inlet of the return assembly 12. This type of system may be optimized for liquid momentum conservation, with energy being returned directly to the compressor drum 14 without the need for any type of additional power transfer system, which may result in reduced energy consumption. As the compressor 10 with the return assembly 12 has fewer moving parts than a compressor with a rotating turbine system, it may also be easier and less expensive to manufacture.

The return assembly 12 may be supported by a cage assembly 16. The rotating compressor drum 14 may be turned by a shaft assembly 18. A drive system (not shown) may provide power to the shaft assembly 18. Before power is applied to the shaft assembly 18, the compressor drum 14 may be filled approximately halfway with a liquid, such as water or a petrochemical, or a liquid and gas. The compressor drum 14 and the contained liquid may then be rotated by the drive and lower shaft assembly 18 until the liquid is forced against the interior wall of the compressor drum 14 by centrifugal forces, forming an annular lake over the interior wall.

Figure 2:
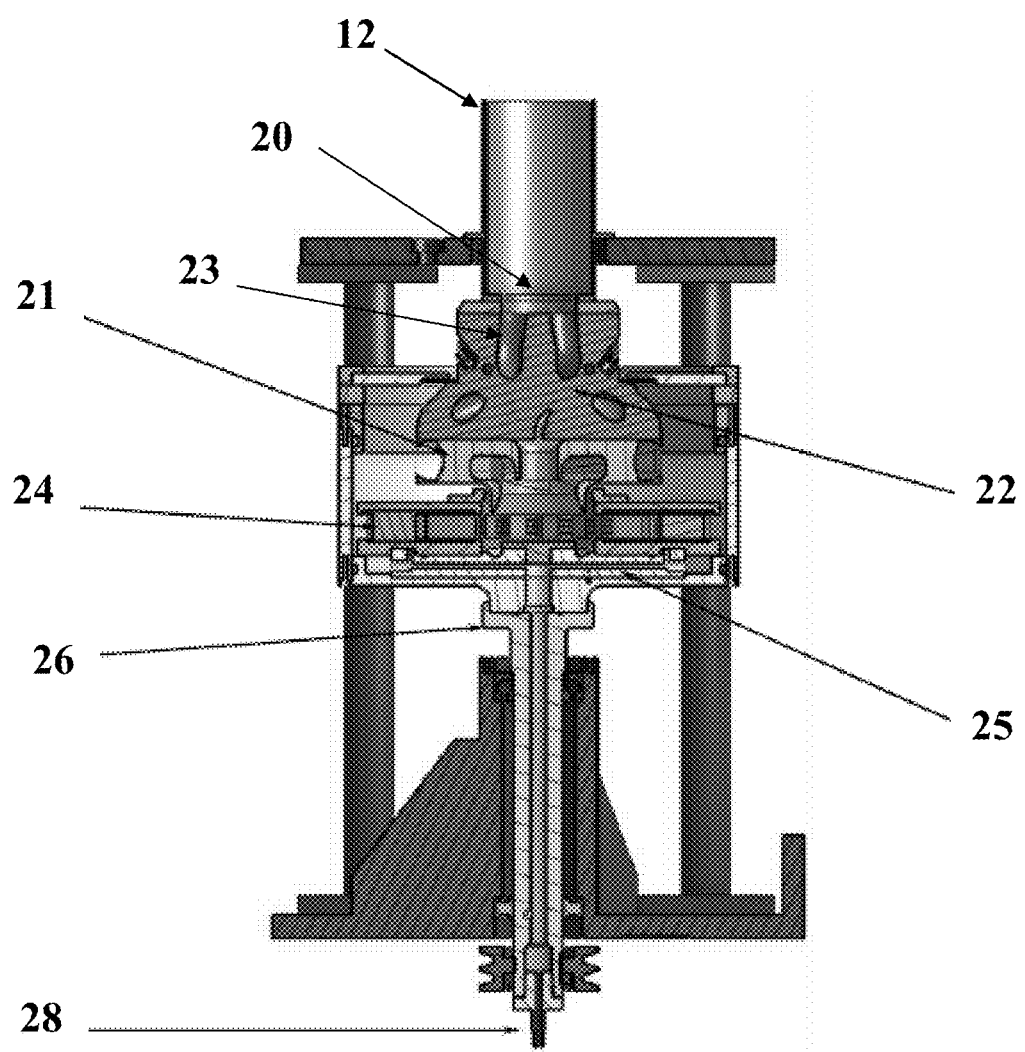
FIG. 2 is a side cross-sectional view of the compressor assembly of FIG. 1.

FIG. 2 illustrates an embodiment of at least a portion of the interior of the compressor 10. The return assembly 12 includes the mounting column 20 and the static vane return (SVR) 21. In an embodiment, rotation of the compressor drum 14 may cause gas external to the compressor drum 14 to be pulled into the compressor 10 through an opening, such as in the top or upper portion of the compressor 10, and directly into the SVR 21. Although reference is made herein to the compressor 10 being vertically aligned, wherein the first end of the compressor 10 or one of its components is essentially the top or upper portion of that component and the second end is the opposite end, i.e., the bottom or lower portion of that component, it will be appreciated that the compressor 10 may operate in a horizontal or other alignment, such that the first end is one side and the second end is an opposite side.

In an embodiment the return assembly may also include the ducted spacer block 22. The ducted spacer block 22 may have a first end that extends through an opening in a first end of the compressor drum 14 and is connected to the mounting column 20. A second (i.e., opposite) end of the ducted spacer block 22 may be connected to a first end of the SVR 21. Gas may enter the mounting column 20 and be pulled into the compressor through gas inlet channels 23 or gas may be pulled around a shield ring positioned around the ducted spacer block 22 (shown as shield ring 46 in FIG. 4) and into the SVR inlets 52A.

Figure 6:
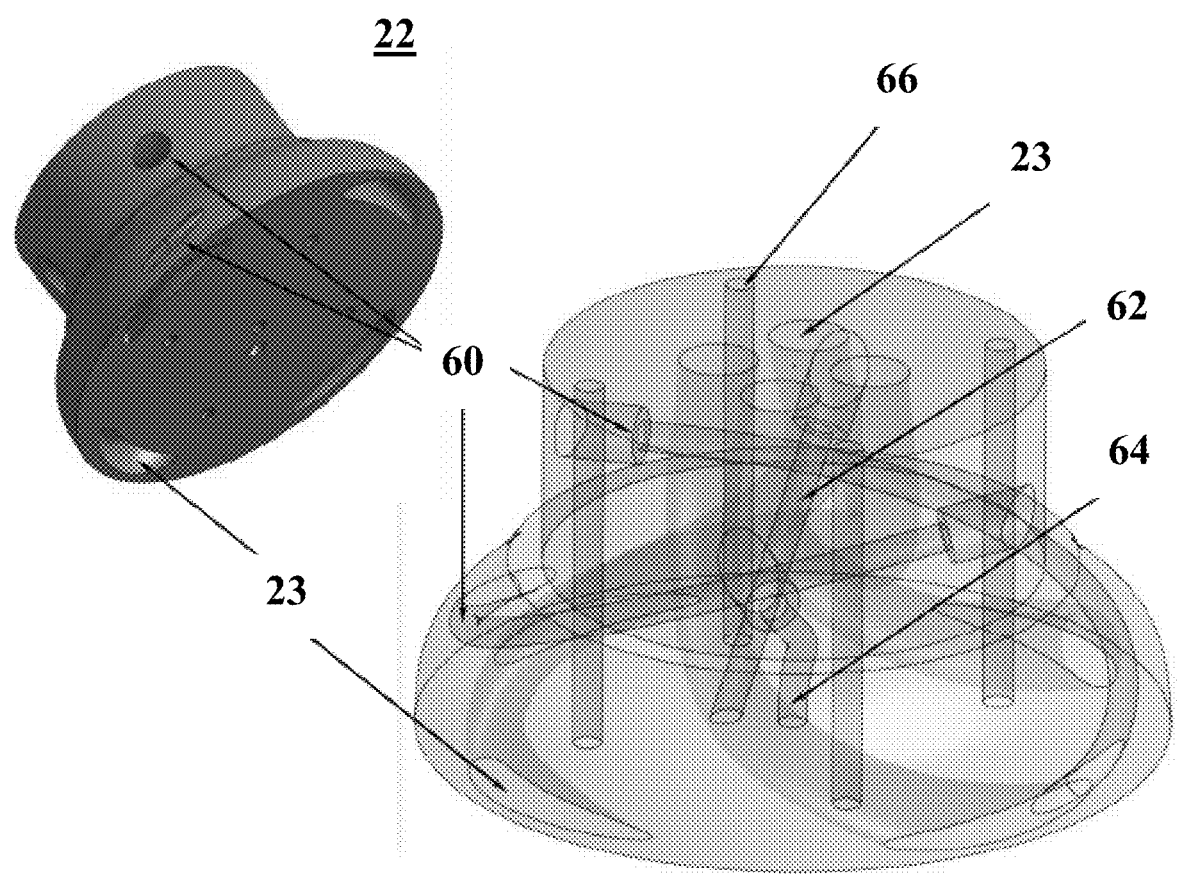
FIG. 6 includes perspective and translucent illustrations of the ducted spacer block of the return assembly of FIG. 4.

In an embodiment, and as more fully illustrated in FIG. 6, there may be four gas inlet channels 23 that start where the first end of the ducted spacer block 22 connects to the mounting column 20 and that may be configured to route incoming gas through the mounting column 20 into the compressor drum 14, although any number of channels may be used as appropriate for a desired gas flow and the routing flow may be different. The gas inlet channels 23 may not be needed when gas is pulled around the shield ring.

A compression channel assembly 24 may be positioned inside the compressor drum 14 such that the first end of the compression channel assembly 24 is next to but separate and apart from the second end of the SVR 21. A gas harvest plate 25 may be positioned at the second end of the compression channel assembly 24. The gas harvest plate 25 may be connected to first end of the shaft 26. The second end of the shaft 26 may be connected to a gas harvest nipple 28.

Figure 3:
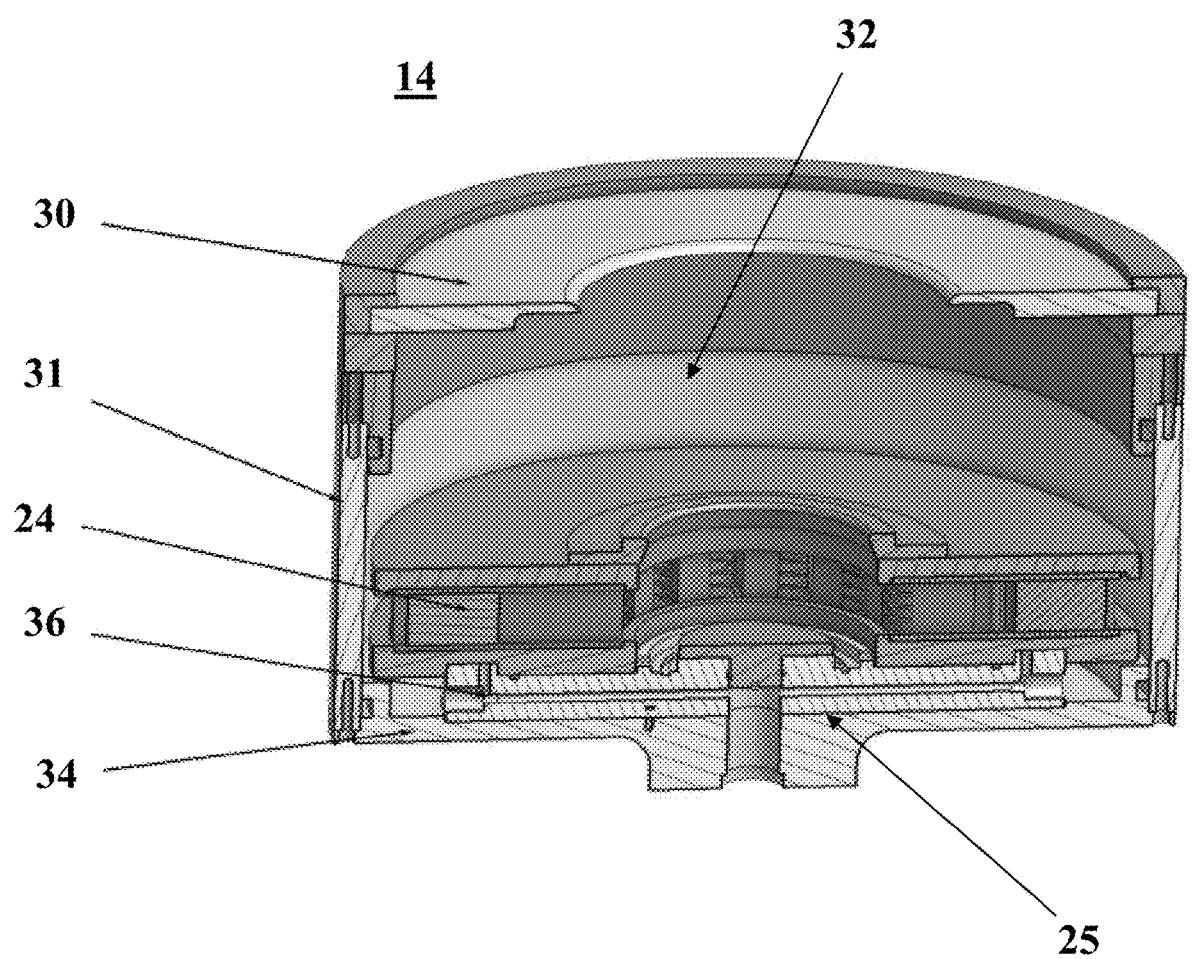
FIG. 3 is a cross-sectional view of the drum section of the compressor assembly of FIG. 2.

The inside of the compressor drum 14 is further illustrated in FIG. 3. As noted, the first end of the compressor drum 14 may include a compressor drum lid 30 that includes an opening for the ducted spacer block 22. The cylindrical outer side portion of the compressor drum 14 may be formed by the rotating housing 31, which may form an open central area 32 having a first end at the compressor drum lid 30. The compression channel assembly 24, which is more fully described below, may sit at the second opposite end of the open central area 32 from the compressor drum lid 30. A drum plate 34 may form the second opposite end of the compressor drum 14. Between the compression channel assembly 24 and the drum plate 34 may be the gas harvest plate 25, which may include gas harvest passage 36, as further explained below. In an embodiment with no ducted spacer block 22, the compressor drum 14 may have a more compact design.

Figure 4:
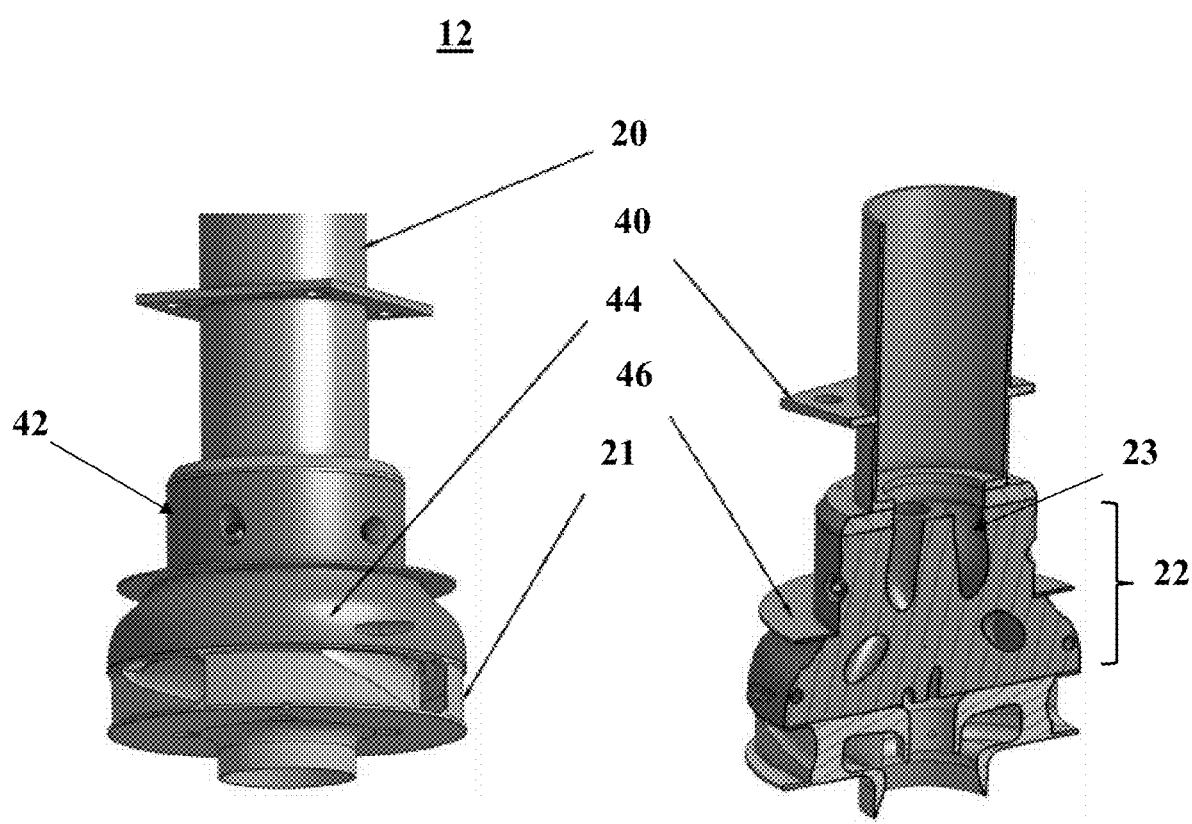
FIG. 4 is a perspective view and a cross-sectional view of a return assembly of the drum section of FIG. 3.

FIG. 4 further illustrates the return assembly 12. The return assembly 12 may be a static or non-rotating device that may be used to return (i.e., recycle) liquid from the outer side portion of the compressor drum 14 to the center of the compressor drum 14. The return assembly may also draw gas into the compressor 10 and may pre-pressurize that gas before being further compressed within the compression channel assembly 24. The return assembly 12 may also balance gas and liquid levels within the compressor 10, adding or removing gas and liquid to and from a common pressure zone as needed, as further described herein. As shown in FIG. 4, the mounting column 20 may be circumscribed by a mounting flange 40 that may be affixed to the cage assembly 16, as shown in FIG. 1. The ducted spacer block 22 may have a first portion 42 that includes one or more ducts 23, a second opposite portion 44, and a seal plate 46.

During operation, liquid or a fluid may fill the gap between the plate 46 and the compressor drum lid 30 and gas may be drawn around the plate 46 as well. As the annular lake level increases, the lake may act as a p-trap that contains the gas within the compressor drum 14. As previously noted, the SVR 21, which is more fully illustrated in FIG. 5, may be affixed to the bottom of the ducted spacer block 22.

Figure 5:
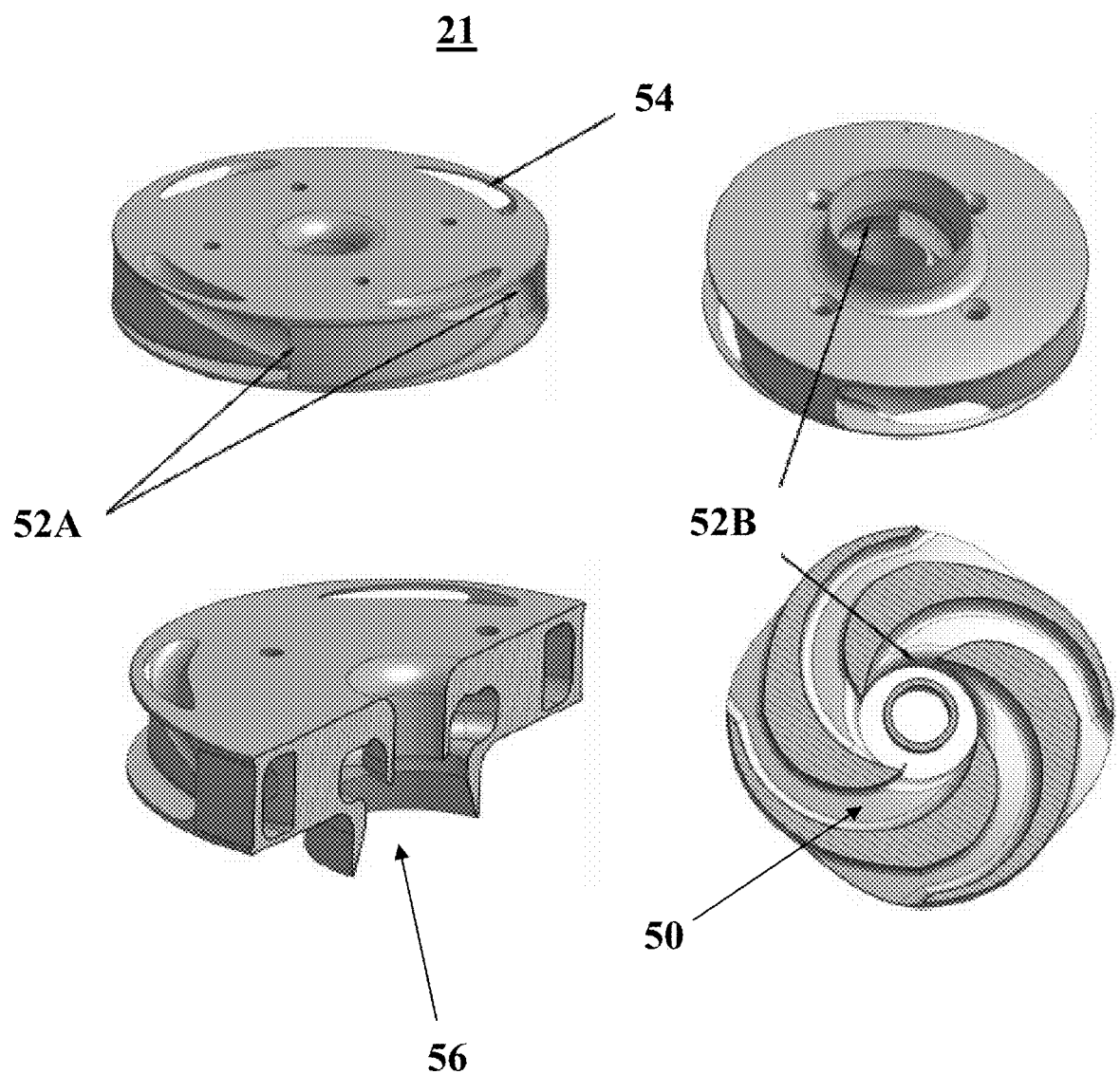
FIG. 5 includes perspective, cross-section and top view of the static vane return of the return assembly of FIG. 4.

FIG. 5 provides more detailed views of the SVR 21 in accordance with an embodiment. As will be more fully explained below with reference to FIG. 7, as liquid is added to the compressor drum 14, the liquid level of the annular lake may move higher, meaning towards the center of the compressor drum 14. Eventually, the liquid level may rise to the level of the vanes 50, at which point the liquid may enter the vanes 50 at the inlet 52A. Although there are four vanes 50 shown in the embodiment, there may be less than four vanes, including a single vane if properly balanced, or more than four vanes in other embodiments. The SVR 21 may also be replaced in other embodiments with alternative solutions for drawing liquid from the annular lake, as further discussed herein.

Penetrations or ducts (not shown) in the embodiment of SVR 21 shown in FIG. 5 may also be provided in an embodiment. Such penetrations or ducts may be pitot ducts, liquid make up ports, and/or pressure relief ports as further described herein. Such penetrations or ducts in the SVR 21 may be similar to the penetrations or ducts of the ducted spacer block 22, as further described herein. As the fluid level increases within the compressor drum 14 the vanes 50 may become submerged and liquid may be drawn from the lake into the SVR 21. At the same time, pitot ducts (shown but not labeled in FIG. 4, and further described below) positioned near the vanes 50 in the SVR 21 or in a second portion 44 of the ducted spacer block 22 may allow removal of liquid from the drum, potentially to drain off excess liquid or implement a cooling system.

Fluid, including possibly low-pressure gas, may exit the vanes 50 at the outlets 52B. The vanes 50 may have a substantially constant cross-sectional area, although the orientation may change from vertical to horizontal from the outer circumference of the SVR 21 to the interior area of the SVR 21. For example, the vane 50 may ramp downward from the inlet 52A at the top of the SVR 21 toward the bottom of the SVR 21 but become substantially level at the outlet 52B. As a result, the fluid flow at the outlet 52B may be substantially tangentially and downward. Other shapes, orientations and arrangements of the vanes 50 are possible.

The second end of ducted spacer block 22 may be mated to the first end of SVR 21 such that the gas inlet channels 23 of the ducted spacer block 22 may be matched to the SVR gas intake ports 54 of the SVR 21. The liquid spinning in the compressor drum 14 may be traveling very fast relative to the inlet gas as the liquid enters the vane 50, which may cause the incoming gas to achieve some fraction of the liquid velocity while moving through the vanes 50. This action may serve to draw gas into the inlet 52A along with the liquid and may pre-pressurize gas in the fluid as it enters a central inlet chamber 56.

FIG. 6 provides a more detailed illustration of the ducted spacer block 22 which may include a number of different penetrations, including the four gas inlet channels 23, two pitot ducts 60, a liquid make up port 62, a pressure relief port 64 and four bolt holes 66. The bolts hole 66 may pass all the way through the ducted spacer block 22 from the first end to the second end so that the ducted spacer block 22 may be sandwiched between the SVR 21 and the mounting column 20. The gas inlet channels 23 may be formed so as to allow an adequate volume of gas to pass into the compressor 10. The gas inlet channels, together with the mounting column 20 may make it possible to plumb the compressor 10 directly from a gas source, to allow the compressor to operate in an ambient atmosphere, and to allow the compressor to be fed with gas from another source. As noted above, the pitot ducts 60 may make it possible to remove liquid once their inlets are partially or fully submerged.

Figure 7:
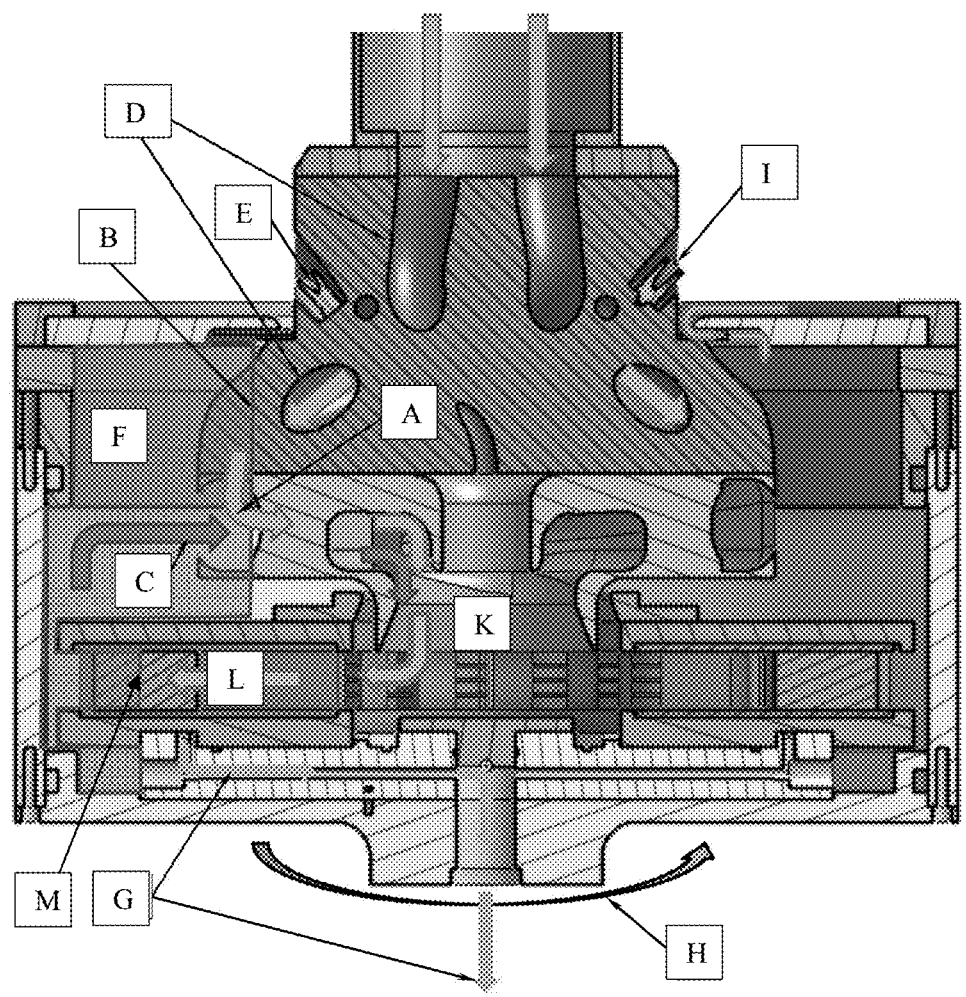
FIG. 7 is a cross-sectional view of the drum assembly of the compressor assembly of FIG. 2 and further illustrating gas and liquid process flow.

Turning now to FIG. 7, the operation of the compressor 10 may be explained. Once the compressor drum 14 has been roughly half filled with liquid, the shaft may be rotated in the direction of rotation (H). Such rotation of the compressor drum may cause the liquid to be forced against the interior wall of the rotating housing 31 (as shown in FIG. 3) by centrifugal force (F). As the liquid is spun against the interior wall of the rotating housing 31, the level (B) of the liquid may be perpendicular to the direction of rotation (H). The level (B) may be adjusted by adding liquid through one or both of the liquid make up port 62 at (I) or the water inlet 64 at (E) or by removing liquid with the pitot ducts 60, as further illustrated in FIG. 6.

When the level (B) of the liquid has reached the edge of the SVR 21, a portion of the liquid (C) may be diverted into the vanes 50 of the SVR 21 and may be forced into the central inlet chamber 56 (K). As noted above, if the liquid is mixed with gas at this point, the rotation of the drum and the resulting velocity of the mixed fluid relative to the incoming gas (A) may result in low pressure gas being drawn into compressor 10, such as between the top of the compressor drum 14 and the ducted spacer block 22 and/or through the gas inlet channels 23 (D), and into the central inlet chamber 56 (K) along with the liquid (C). Pulling the low pressure gas (A) into the compressor with the high velocity liquid (C) may pre-pressurize the gas in the central inlet chamber 56 (K) upstream of the compression channels of the compression channel assembly 24. Although reference is made to the central inlet chamber (K) being a central opening formed in the SVR 21, the central inlet chamber (K) includes the joining of the openings formed in the middle of the compression channel assembly 24 and the top of the gas harvest plate 25, as more clearly illustrated in FIGS. 3 and 7.

From the central inlet chamber (K), fluid may be forced through the inlets of the compressions channels (L) of the rotating compression channel assembly 24 by mixing and centrifugal force (F) on the fluid portion of the resulting emulsion. As further explained below, the gas in the liquid/gas fluid emulsion may be compressed within the compression channel assembly 24. As the fluid emulsion may leave the outlets of the compression channels (L) the compressed gas (G) and the liquid (C) may immediately separate due to their differing densities. The liquid (C) may return to the annular lake in the compression drum, thereby returning rotational energy in the liquid back to the compressor. The compressed gas (G) may be captured and diverted off as further explained with reference to FIG. 8.

Figure 8:
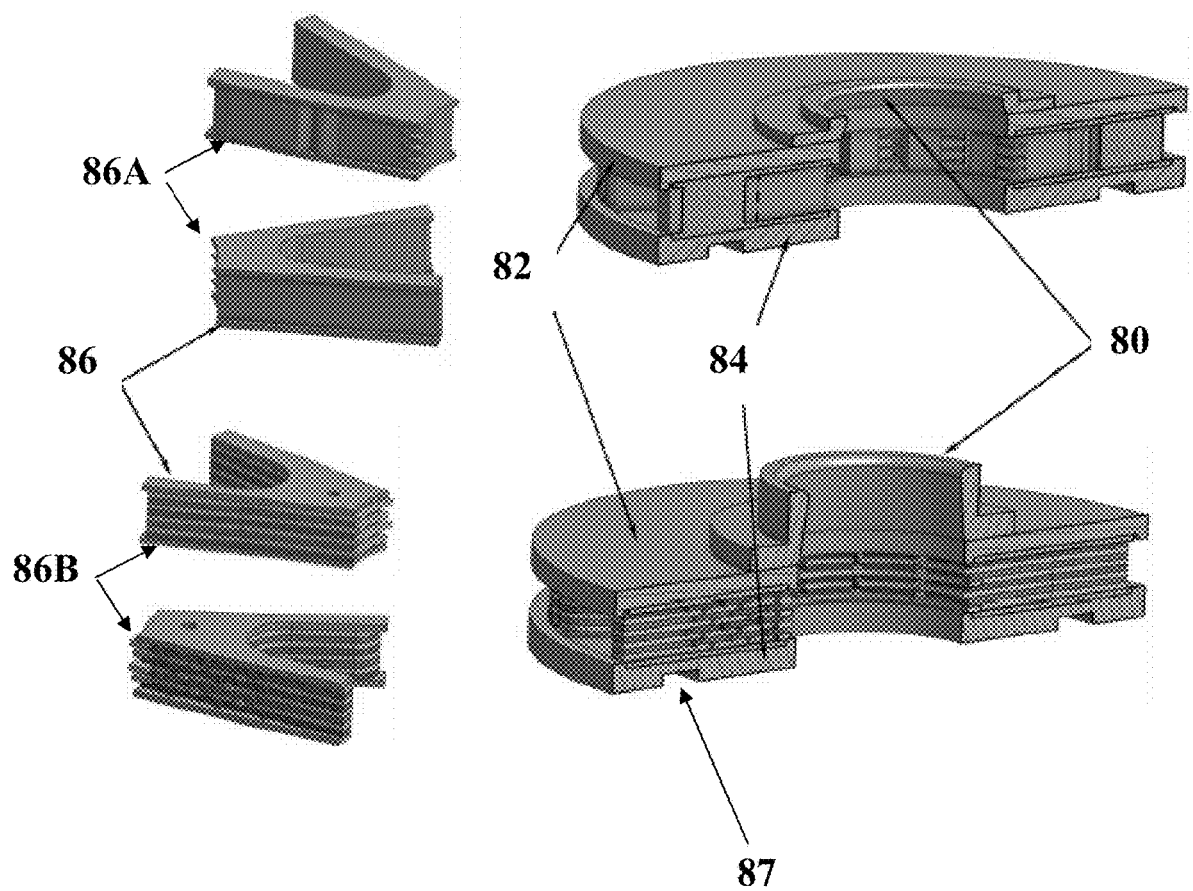
FIG. 8 includes cross-sectional views of portions of the V-block plate of the compressor assembly of FIG. 2.

The compression channel assembly 24, illustrated by the various images in FIG. 8, may utilize a plurality of radially arranged channels with rectangular cross-sections and agitators, rather than capillary tubes or other forms of tubes. The channel architecture may allow for a higher gas flow, while requiring less energy in comparison to prior designs. The compression channel assembly 24 may include a collar 80, a top plate 82, a bottom plate, 84, and a plurality of V-shaped blocks 86. The collar 80 may act as a duct for the incoming fluid and a spacer down to the top of the plate, but may be shortened if a larger (i.e., thicker) plate was desired for greater capacity.

The top plate 82 may act as a pressure plate for trapping the pressurized gas as it separates from the liquid at the outlets of the compression channels. The bottom plate 84 may act as a pressure plate and a gas harvest porting system to the gas harvest plate 25 mounted below. The V-shaped blocks 86 are illustrated in two different embodiments. The V-shaped blocks 86A may be formed of a single manufactured block, such as by machining, casting, molding or even printing. The V-shaped block 86B may be formed from a series of plates with various cross-sections stacked up to create the block assembly. One side of each V-shaped block may be smooth while the other side may include various geometric surface features that may increase gas entrainment (i.e., the separation of gas bubbles between blocks of fluid which serves to compress the gas as the liquid is forced outward by the centrifugal force (F)) and liquid friction within the channels. Both sides of the V-shaped blocks may be textured or geometrically surfaced. The underside of the bottom plate 84 may include a groove 87 further explained below.

Figure 9:
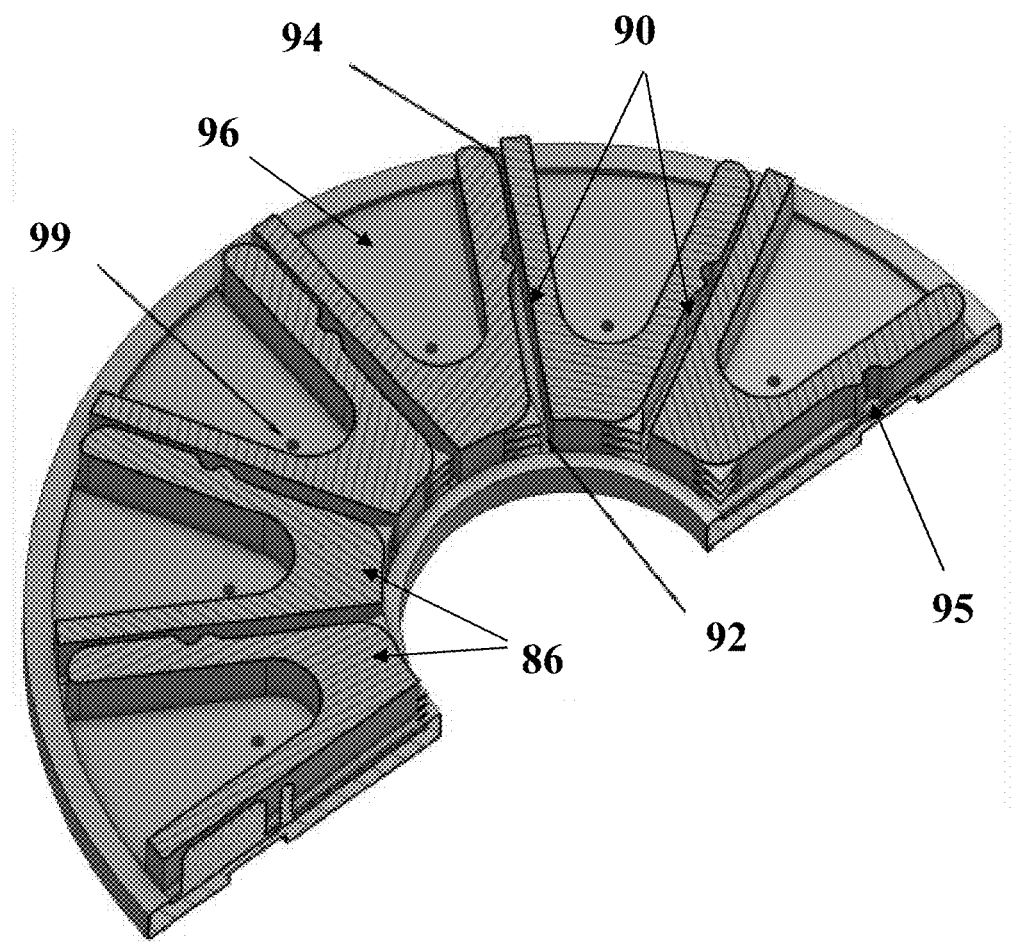
FIG. 9 is a top perspective, cross-sectional view of a portion of the V-block plate of FIG. 8.

As more fully explained with reference to FIG. 9, the compression channels 90 are formed between each of the V-shaped blocks 86. As the emulsion of fluid in the central inlet chamber 56 enters the emulsion inlets 92, liquid in the fluid may be slammed against the trailing walls of the compression channels 90 and pushed down along the length of each compression channel 90 by rotation of the compressor drum 14. Gas in the fluid entering each compression channel 90 may be pulled downward by the rushing liquid. The two streams of liquid and gas may meet at a liquid level determined by the overall liquid column (M) (as shown in FIG. 7) in the compressor drum. The liquid column (M) may act like a waterfall where actual gas entrainment occurs. Prior to arriving at the liquid column (M), the differing densities and centrifugal forces may act to keep the gas and liquid in the fluid largely separated. A venturi-type or eductor-type inlet emulsifier (not shown) may be used to feed the compression channels 90 and may have the potential for increasing the gas/liquid ratio and thereby reduce hydrodynamic drag.

Small surface features 95 in the compression channels 90 may operate as agitators or simply add friction that may assist in the gas compression. The emulsion outlets 94 at the end of each compression channel 90, are below the level of the liquid column (M) where the waterfall exists, may be smooth and taper or narrow to increase the flow velocity as the emulsion leaves the compression channels 90. The velocity increase may aid in overcoming the bubble rise velocity (i.e., the tendency of the gas bubbles to float back up the channels 90 rather than be pushed down and compressed within the compression channels 90) and therefore help to move the gas from the compression channels 90 to the separation chambers 96 formed within the "V" of each V-shaped block. For the same intended purpose of overcoming the bubble rise velocity, the compression channels 90 may also be swept or angled backwards with respect to the rotation direction of the channel assembly 24. The leading side of each emulsion outlet 94 may have a slightly lower or filleted top that may promote gas flow from the compression channels 90 toward the corresponding separation chamber 96 before the emulsion leaves the volume between the top plate 82 and bottom plate 84. A common pressure, and therefore a common liquid column (M), should be maintained across all of the V-shaped blocks to avoid creating any imbalances in the compressor 10.

A small hole formed in the bottom plate 84 may form a separate gas harvest port 99 for each separation chamber 96. The hole may be formed at any of a number of locations. Each of the gas harvest ports 99 may communicate with a common groove 87 on the underside of the bottom plate 84. The groove 87 may align with a common groove (shown in FIG. 3) in the gas harvest plate 25. In some embodiments the bottom plate 84 and gas harvest plate 25 may be combined as a single part. During operation, pressurized gas (G) (in FIG. 7) may be captured within the separation chambers 96 and pass through the gas harvest ports 99 into the common grooves formed between the bottom plate 84 and the gas harvest plate 25. The pressurized gas (G) may then move into an opening (shown in FIGS. 2, 3 and 7) in the lower shaft 26, through the lower shaft 26, and out of the compressor 10 through the gas harvest nipple or valve 28.

Figure 10:
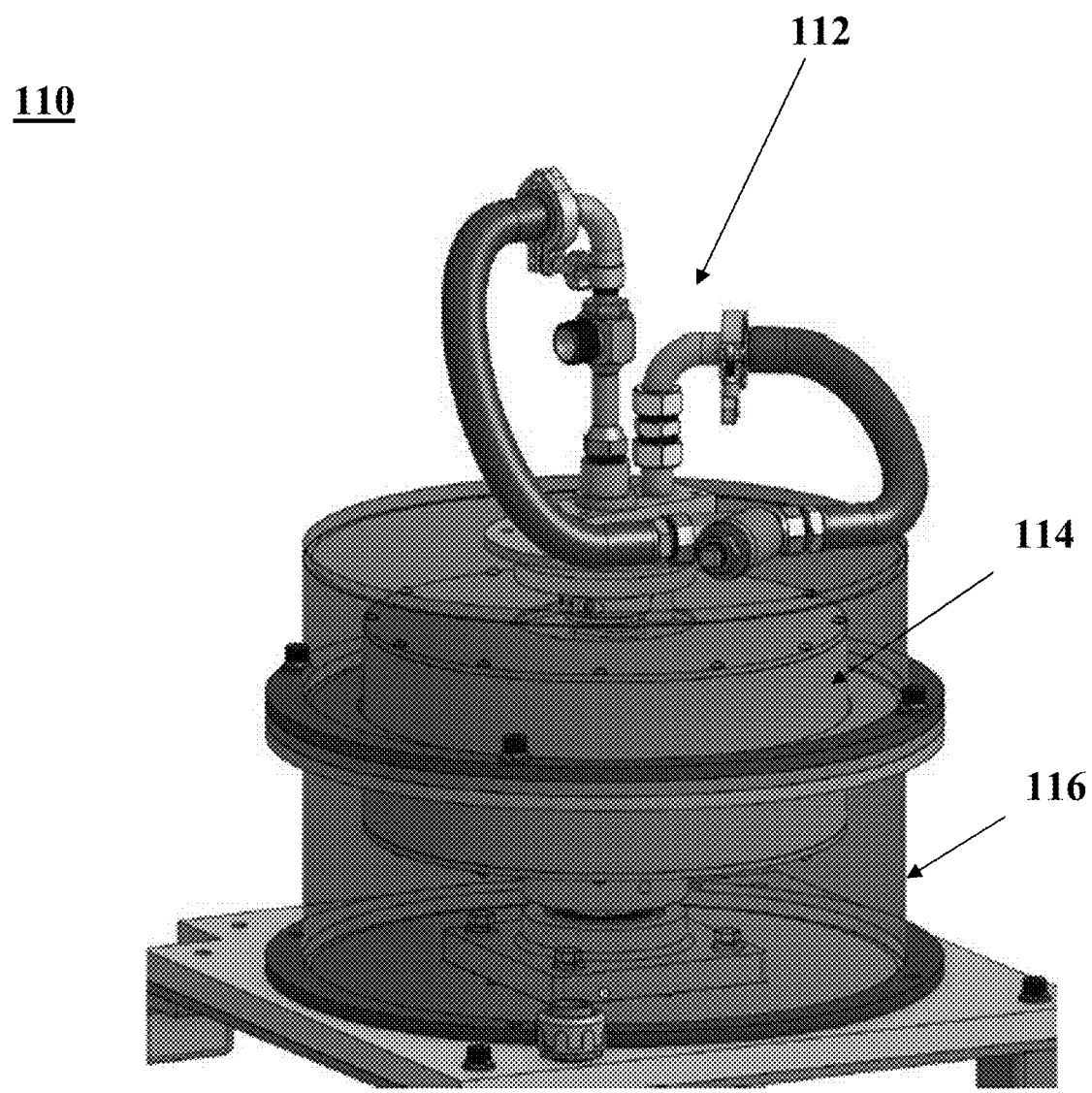
FIG. 10 is a partially translucent perspective view of a compressor assembly in accordance with an embodiment.

An embodiment of a compressor assembly with a different return assembly is illustrated in FIGS. 10, 11, 12A, and 12B. FIG. 10 is a partially translucent perspective view of a compressor assembly 110 in accordance with an embodiment. Compressor assembly 110 includes a different return assembly 112 than compressor assembly 10, as well as a different support assembly 116 in place of cage assembly 16 but includes the same type of compressor drum 114 as compressor drum 14.

Figure 11:
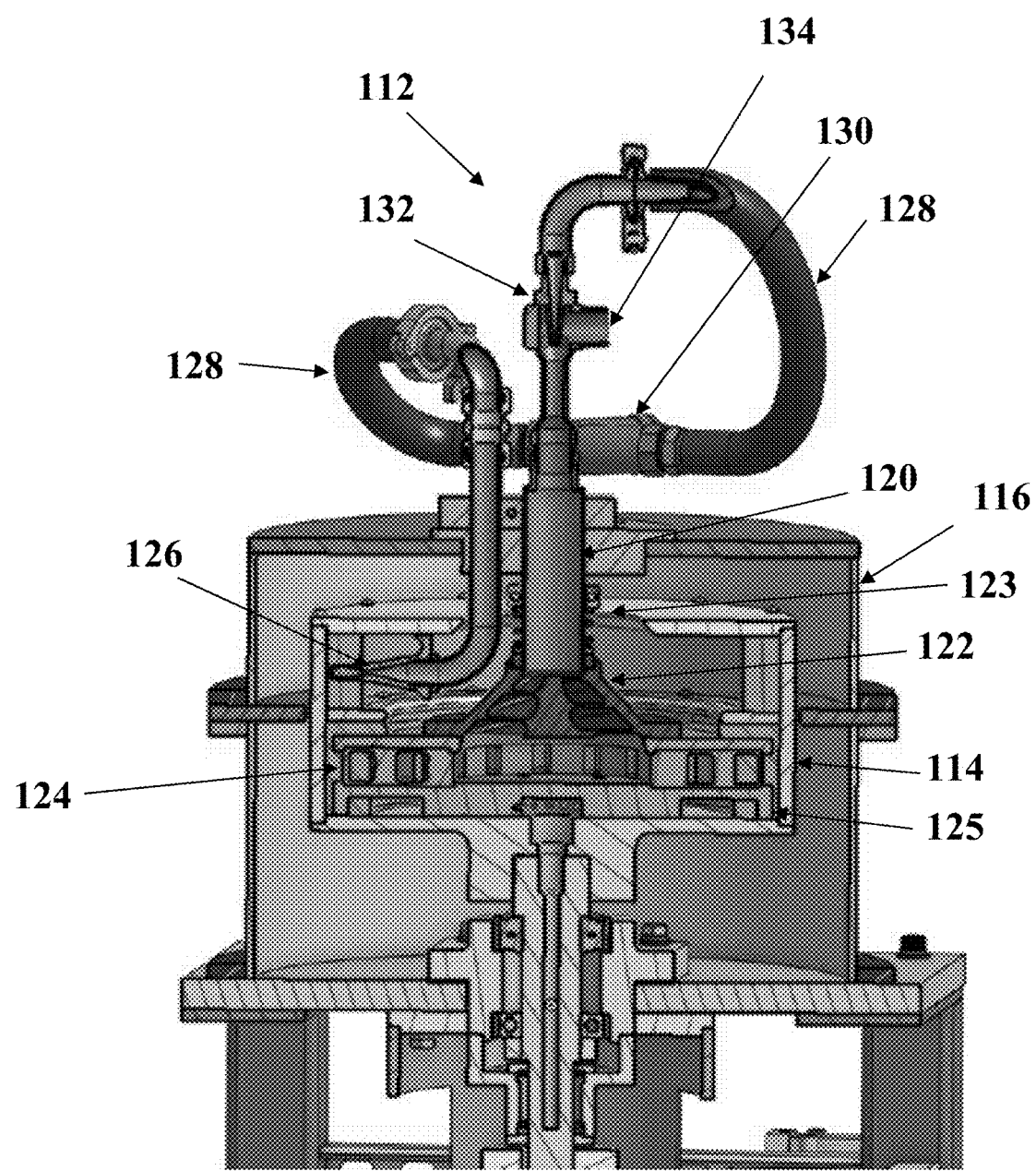
FIG. 11 is a cross-sectional view of the compressor assembly of FIG. 10.

FIG. 11 is a cross-sectional view of the compressor assembly of FIG. 10. The return assembly 112 may include a number of components within the compressor drum 114 and outside of the compressor drum 114. The return assembly includes a mounting column 120 that may be mounted in the support assembly 116 and extend into the compressor drum 114 through an opening in the top of the compressor drum 114 (when the drum is oriented to rotate parallel to the horizon). The outlet at the end of the mounting column 120, which is also the outlet of the return assembly 112, may be positioned just above an inducer 122, as more fully described herein. As the mounting column 120 is stationary and the inducer 122 is fixedly connected to the rotating compression channel assembly 124, the connection between the mounting column 120 and the inducer 122 may be a flexible connection that allows the inducer 122 to rotate without putting stress on the mounting column 120. For example, one or more rotary seals 123 as shown in FIG. 11 may be provided between the fixed mounting column 120 and the inducer 122. As with other embodiments described herein, the gas harvesting plate 125 may be mounted to the bottom of the compression channel assembly 124 so as to draw off compressed gas.

The liquid inlet 126 of the return assembly 112 may include one or more pitot tubes or other appropriate apparatus for drawing liquid from the annular lake (as previously discussed herein) in the compressor drum 14. Although only one inlet is shown, multiple pitot tubes or other inlets could feed into the connective tubing 128 or there could be multiple connective tubes, one associated with each of the inlets. Connective tubing 128 may route the liquid through an in-line filter 130 and then to an eductor 132 and/or a gas inlet. The eductor 132 may be designed to take advantage of the Venturi Effect, wherein the flow of liquid through the eductor may create a pressure differential along the length of the eductor. Specifically, the liquid flow at a tapered, narrow region at the vertical outlet of the eductor 132 may have a lower pressure than the wider portion of the liquid flow path at the eductor's vertical inlet. The lower pressure region may create a suction within the orthogonal gas inlet 134 that draws gas into the eductor 132. The gas may be compressed to a first pressure within the eductor 132, due to mixing with the liquid, and exit the eductor 132 into the mounting column 120, through which it flows into the inducer 122.

Figure 12A:
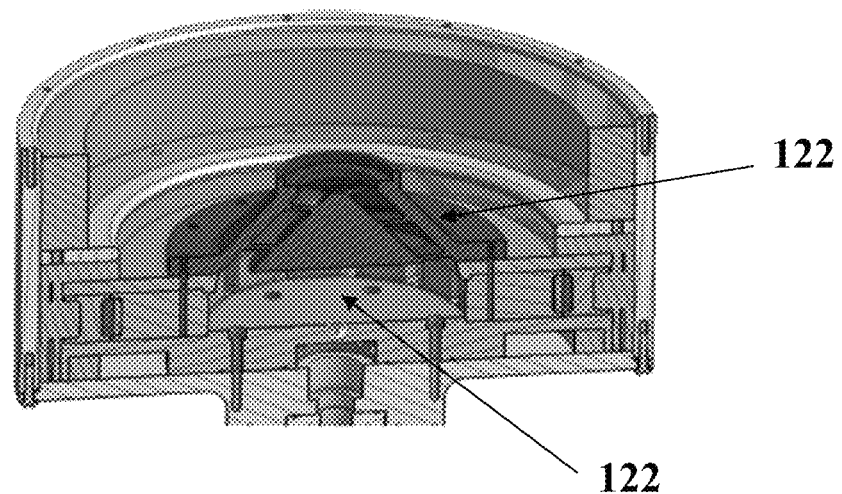
FIG. 12A is a cross-sectional view of the drum section, the inducer and the compression channel assembly.
Figure 12B:
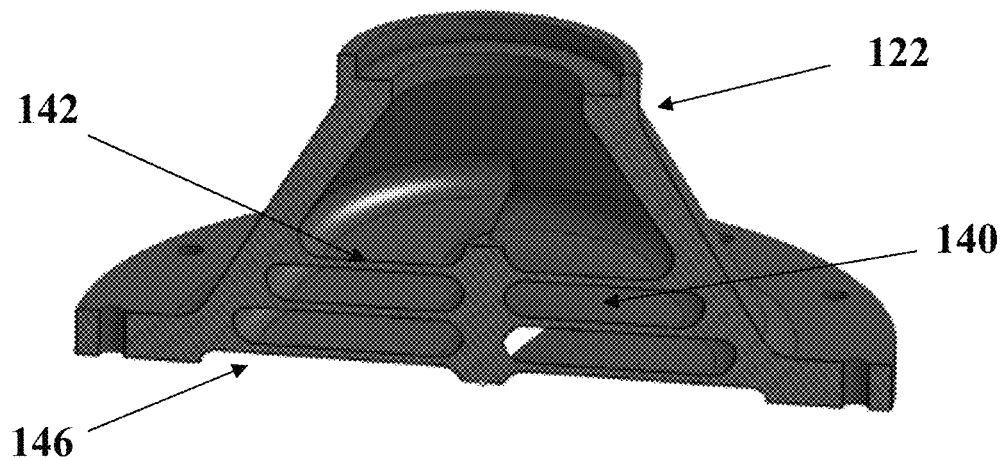
FIG. 12B is a cross-sectional view of the inducer of FIG. 12A.

FIG. 12A is a cross-sectional view of the drum section, the inducer and the compression channel assembly. FIG. 12B is a cross-sectional view of the inducer of FIG. 12A. The inducer 122 is mounted to the compression channel assembly 124 and may be configured to create a differential pressure between the return assembly 112 and the compression channel assembly 124. This differential pressure may create near zero gauge pressure at the vertical outlet of the eductor 132, which may make it possible to pull in more gas at the orthogonal gas inlet 134. The inducer 122, as more closely shown in FIGS. 12A and 12B, may include a corkscrew shaped chamber 140 formed by one or more thin veins 142 that run from an upper opening 144 to a lower exit 146 into the common pressure zone 148. The angles of the winding of the veins and the slope of the veins may depend on the particular flow pressure case to be achieved for an application.

In an embodiment, a gas compressor comprising a cylindrical drum having a first end and a second end opposite the first end, the second end affixed to a shaft configured to rotate the drum, the drum including a compression channel assembly configured to rotate with the drum and defining a plurality of compression channels, each compression channel extending outwardly from an opening at a centralized common pressure zone toward an area adjacent an interior surface of the drum, and a return assembly configured not to rotate with the drum and having at least one liquid inlet, a fluid outlet, a gas inlet and tubing connecting the liquid inlet and the gas inlet to the fluid outlet, the at least one liquid inlet extending into an annular lake formed within the drum when the drum is rotated and configured to draw liquid from the annular lake, the tubing configured to channel the liquid toward the gas inlet where the liquid is mixed with incoming gas and channeled to the fluid outlet. Wherein fluid entering the centralized common pressure zone is forced into the opening of each compression channel, wherein gas in the fluid within each compression channel is compressed as it travels from the centralized common pressure zone toward the area adjacent the interior surface, wherein at least some of the pressurized gas is separated from the liquid in the fluid prior to leaving the compression channel assembly, and wherein the liquid is returned to the annular lake.

In the embodiment, further comprising a pressurized gas harvesting system configured to separate the pressurized gas from the liquid in the fluid.

In the embodiment, wherein the pressurized gas harvesting system includes a plate adjacent the compression channel assembly, the plate including passages formed therein and configured to receive the pressurized gas from the compression channel assembly.

In the embodiment, wherein a first end of the passages of the plate aligns with openings formed in the compression channel assembly and a second opposite end of the passages connects to a gas harvest port.

In the embodiment, wherein the at least one liquid inlet is a pitot tube.

In the embodiment, further comprising an inducer fixedly connected to the compression channel assembly and positioned between the outlet of the return assembly and the opening of the centralized common pressure zone, the inducer being configured to create a differential pressure between the return assembly and the compression channel assembly.

In the embodiment, wherein the return assembly includes an eductor connected to the gas inlet, wherein the liquid flowing through the eductor creates a pressure differential along a length of the eductor that draws gas into the gas inlet.

In the embodiment, wherein the return assembly includes a filter between the liquid inlet and the fluid outlet.

In the embodiment, further comprising a support assembly configured to support the drum and the return assembly, the return assembly further including a mounting column forming the fluid outlet, the mounting column being flexibly coupled to the inducer so that the mounting column is stationary while the inducer is rotating.

In the embodiment, wherein the inducer includes a spiral chamber formed by an angled vein that travels from an inlet adjacent the fluid outlet of the return assembly and an outlet adjacent the centralized common pressure zone.

In the embodiment, wherein the compression channel assembly includes a plurality of V-shaped blocks, wherein each V-shaped block is positioned near another V-shaped block so as to form each compression channel therebetween.

In the embodiment, wherein the compression channel assembly includes a first plate on a first side of the plurality of V-shaped blocks and a second plate on a second opposite side of the plurality of V-shaped blocks, and wherein pressure across each compression channel of the plurality of compression channels is balanced.

In the embodiment, wherein the plurality of V-shaped blocks are formed from a single block shaped to form a first wall of a first adjacent compression channel and to form a second wall of a second adjacent compression channel.

In the embodiment, wherein the first wall includes a smooth surface and the second wall includes a geometric feature surface.

In the embodiment, wherein the geometric feature surface is angled from a direction of rotation of the drum.

In the embodiment, wherein the plurality of V-shaped blocks are one or more of machined, casted, molded, and printed.

In the embodiment, wherein the plurality of V-shaped blocks are formed from a series of plates stacked to form a first wall of a first adjacent compression channel and to form a second wall of a second adjacent compression channel.

In the embodiment, wherein the first wall includes a smooth surface and the second wall includes geometric feature surface.

In the embodiment, wherein the geometric feature surface is angled from a direction of rotation of the drum.

In the embodiment, wherein the series of plates have different cross-sections so as to form the first wall and the second wall.

While the present disclosure has been illustrated and described herein in terms of several alternatives, it is to be understood that the techniques described herein can have a multitude of additional uses and applications. Accordingly, the disclosure should not be limited to just the particular description, embodiments and various drawing figures contained in this specification that merely illustrate one or more embodiments, alternatives and application of the principles of the disclosure.

What is claimed:

1. A gas compressor, comprising:
    a cylindrical drum having a first end and a second end opposite the first end, the second end affixed to a shaft configured to rotate the drum, the drum including a compression channel assembly configured to rotate with the drum and defining a plurality of compression channels, each compression channel extending outwardly from an opening at a centralized common pressure zone toward an area adjacent an interior surface of the drum; and
    a return assembly configured not to rotate with the drum and having at least one liquid inlet, a fluid outlet, a gas inlet and tubing connecting the liquid inlet and the gas inlet to the fluid outlet, the at least one liquid inlet extending into an annular lake formed within the drum when the drum is rotated and configured to draw liquid from the annular lake, the tubing configured to channel the liquid toward the gas inlet where the liquid is mixed with incoming gas and channeled to the fluid outlet;
    wherein fluid entering the centralized common pressure zone is forced into the opening of each compression channel, wherein gas in the fluid within each compression channel is compressed as it travels from the centralized common pressure zone toward the area adjacent the interior surface, wherein at least some of the pressurized gas is separated from the liquid in the fluid prior to leaving the compression channel assembly, and wherein the liquid is returned to the annular lake.

2. The gas compressor of claim 1, further comprising a pressurized gas harvesting system configured to separate the pressurized gas from the liquid in the fluid.

3. The gas compressor of claim 2, wherein the pressurized gas harvesting system includes a plate adjacent the compression channel assembly, the plate including passages formed therein and configured to receive the pressurized gas from the compression channel assembly.

4. The gas compressor of claim 3, wherein a first end of the passages of the plate aligns with openings formed in the compression channel assembly and a second opposite end of the passages connects to a gas harvest port.

5. The gas compressor of claim 1, wherein the at least one inlet is a pitot tube.

6. The gas compressor of claim 1, further comprising an inducer fixedly connected to the compression channel assembly and positioned between the outlet of the return assembly and the opening of the centralized common pressure zone, the inducer being configured to create a differential pressure between the return assembly and the compression channel assembly.

7. The gas compressor of claim 6, further comprising a support assembly configured to support the drum and the return assembly, the return assembly further including a mounting column forming the fluid outlet, the mounting column being flexibly coupled to the inducer so that mounting column is stationary while the inducer is rotating.

8. The gas compressor of claim 6, wherein the inducer includes a spiral chamber formed by an angled vein that travels from an inlet adjacent the fluid outlet of the return assembly and an outlet adjacent the centralized common pressure zone.

9. The gas compressor of claim 1, wherein the return assembly includes an eductor connected to the gas inlet, wherein the liquid flowing through the eductor creates a pressure differential along a length of the eductor that draws gas into the gas inlet.

10. The gas compressor of claim 1, wherein the return assembly includes a filter between the liquid inlet and the fluid outlet.

11. The gas compressor of claim 1, wherein the compression channel assembly includes a plurality of V-shaped blocks, wherein each V-shaped block is positioned near another V-shaped block so as to form each compression channel therebetween.

12. The gas compressor of claim 11, wherein the compression channel assembly includes a first plate on a first side of the plurality of V-shaped blocks and a second plate on a second opposite side of the plurality of V-shaped blocks, and wherein pressure across each compression channel of the plurality of compression channels is balanced.

13. The gas compressor of claim 11, wherein the plurality of V-shaped blocks are formed from a single block shaped to form a first wall of a first adjacent compression channel and to form a second wall of a second adjacent compression channel.

14. The gas compressor of claim 13, wherein the first wall includes a smooth surface and the second wall includes a geometric feature surface.

15. The gas compressor of claim 14, wherein the geometric feature surface is angled from a direction of rotation of the drum.

16. The gas compressor of claim 11, wherein the plurality of V-shaped blocks are one or more of machined, casted, molded, and printed.

17. The gas compressor of claim 11, wherein the plurality of V-shaped blocks are formed from a series of plates stacked to form a first wall of a first adjacent compression channel and to form a second wall of a second adjacent compression channel.

18. The gas compressor of claim 17, wherein the first wall includes a smooth surface and the second wall includes geometric feature surface.

19. The gas compressor of claim 17, wherein the geometric feature surface is angled from a direction of rotation of the drum.

20. The gas compressor of claim 17, wherein the series of plates have different cross-sections so as to form the first wall and the second wall.

* * * * *